June 16, 1925.
L. CAMMEN
SHIP
Filed March 14, 1925
1,542,370
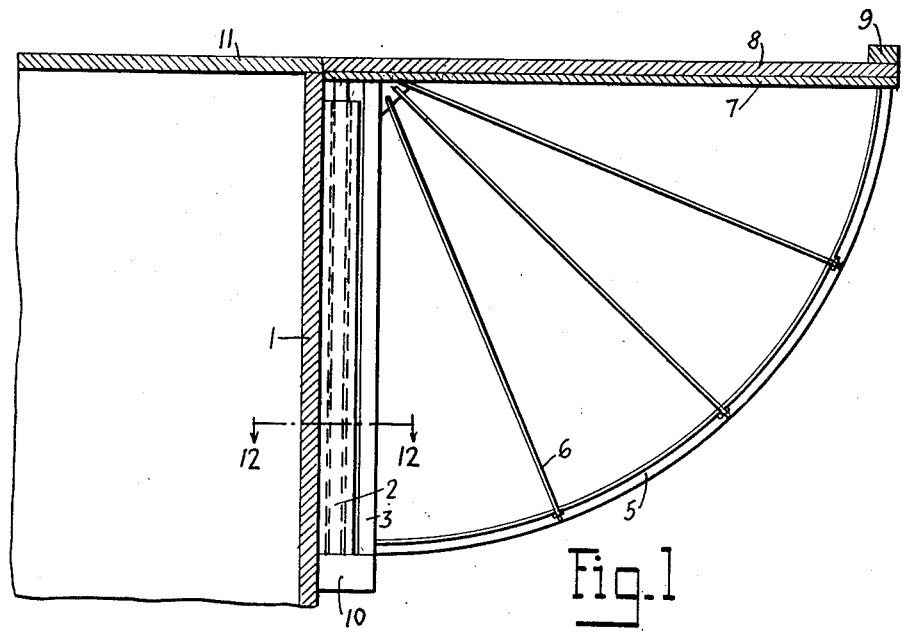
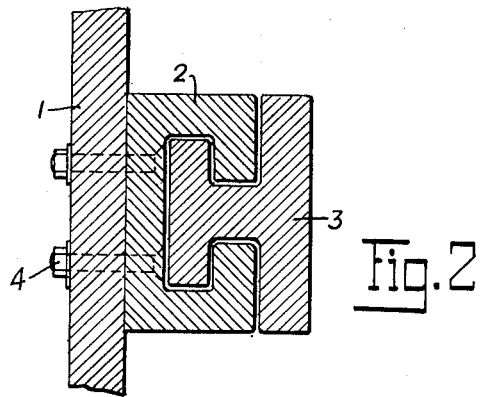
INVENTOR
Leon Cammen Patented June 16, 1925.

1,542,370

UNITED STATES PATENT OFFICE.

LEON CAMMEN, OF NEW YORK, N. Y.

SHIP.

Application filed March 14, 1925. Serial No. 15,520.

*To all whom it may concern:*

Be it known that I, LEON CAMMEN, a citizen of the United States, and resident of the borough of Manhattan, in the city, county, and State of New York, have invented certain useful Improvements in Ships, of which the following is a specification.

The present invention refers to an improvement in ships, and in particular provides means whereby such vessels as battleships, battle cruisers, passenger vessels and freighters might be so equipped as to permit airplanes to start from them and land on them.

In the illustrations, Fig. 1 shows, diagrammatically, a section of the device in a plane at right angles to the longitudinal axis of the ship; Fig. 2 shows a section through plane indicated as 12—12 on Fig. 1.

An airplane landing on a ship, or starting from a ship, must have a certain space in which it could either develop the necessary velocity or lose it as the case may be. Special ships, such as aircraft carriers, have solved this problem by the installation of a special "smooth" upper deck, but ships of conventional design cannot do it for obvious reasons, and yet there are already instances where the ability to have airplanes land on, or start from the ship may be of substantial practical value. This applies particularly to war vessels, as this provision would make it easier for them to cooperate with the air force even when not accompanied by special aircraft carriers.

Essentially, the present invention provides what might be described as a side-shelf to the vessel, extending possibly the entire length of the ship off one of its sides sufficiently to provide the necessary runway for airplane operation. A further refinement lies in the possibility to install or remove this shelf in a comparatively short time.

The wall of the ship is shown here as 1; to this is attached the female dovetail 2 held to the wall of the ship in some such manner as by screws or belts 4; in the dovetail 2 slides the member 3—7, consisting of the male dovetail 3 which is vertical, the horizontal beam 7, and the intervening frame 5—6 the purpose of which is to reduce the bending stresses on beam 7. If desired, an additional member, such as tierod 11, may be provided to reduce the tensile stresses on 7. Over the beams 7 is then laid a flooring 8 which forms the runway for the aeroplanes, and may be provided with a raised portion 9 at its outer edge to prevent the planes from slipping off.

The female dovetail elements 2 are supposed to be attached to the ship walls at all times. All that is necessary to operate the planes from the ship is to slip the frames 3—7 into the position shown in Fig. 1, connect the tierods 11 where provided, and roll the flooring 8 over the beams 7. It will be also noticed that when the airplane shelf is not in operation, it may be conveniently stored, as it is all made up of comparatively thin flat sections.

If desired, abutments 10 may be provided, to relieve the side pull on the member 2.

It is not necessary to present here the details of the design of the device, as any engineer skilled in structural engineering and especially bridge design, who has fully understood the principle of the operation of the device, will have no trouble in designing the device in a manner suitable to the individual requirements of each case. No Novelty is claimed for the design shown in Fig. 2 and it is described here merely as one of the many possible embodiments of the present invention, and many other ways of doing this are possible. Thus, member 2 might be omitted, and member 3 suspended by a hook from the upper edge of the wall 1; the sector 5 and tierods 6 might be replaced by a latticed structure, etc. All these are matters within the province of the designing engineer, and a man skilled in the art will have no trouble in selecting the proper structure to meet individual conditions of each case.

As described here, the shelf is made removable. This is not absolutely necessary, but advisable, as a permanent structure of this character might prove in the way under certain conditions, and even dangerous. It must be remembered in this connection that the width of the shelf should be roughly 60 per cent of the wing spread of the plane, which may mean even with the planes of today a width of the shelf of the order of 60 to 75 feet.

Where the platform is permanent, the floor member 8 may be laid in sections or continuously, in the same manner as is now done on bridges; where however the platform is of the removable type, little is gained by making the floor members greater than is necessary to cover the span between two frame members 7 along the side of the vessel, and there is a practical advantage in making them of only reasonable length, so as to permit their convenient storage and easy handling.

I claim:

On a ship, a horizontal platform extending from the side thereof over the water, to afford starting or landing facilities for aircraft, said platform comprising floor members serving as runways for aircraft in starting or landing, and frames to support said floor members in proper relation to the ship, said frames consisting of stationary elements attached to the wall of the ship, and other elements held by said stationary elements and being in such relation thereto as to permit rapid erection and disassembling of said frames.

Signed in New York, in the county and State of New York, March 13, 1925.

LEON CAMMEN.

Witness:
LOUISE LEINSCHMIDT.